United States Patent
Park et al.

(10) Patent No.: US 10,147,939 B2
(45) Date of Patent: Dec. 4, 2018

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Sun-Il Park, Yongin-si (KR); Young-Kee Kim, Yongin-si (KR); Joon-Kil Son, Yongin-si (KR); Soojeong Lee, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 0 days.

(21) Appl. No.: 15/437,810

(22) Filed: Feb. 21, 2017

(65) Prior Publication Data

US 2017/0244099 A1   Aug. 24, 2017

(30) Foreign Application Priority Data

Feb. 24, 2016 (KR) .................. 10-2016-0021997

(51) Int. Cl.
| | |
|---|---|
| H01M 4/00 | (2006.01) |
| H01M 4/36 | (2006.01) |
| H01M 10/0525 | (2010.01) |
| H01M 4/485 | (2010.01) |
| H01M 4/62 | (2006.01) |
| H01M 4/525 | (2010.01) |

(52) U.S. Cl.
CPC .......... *H01M 4/364* (2013.01); *H01M 4/485* (2013.01); *H01M 4/525* (2013.01); *H01M 4/625* (2013.01); *H01M 10/0525* (2013.01)

(58) Field of Classification Search
CPC .. H01M 4/364; H01M 10/0525; H01M 4/485; H01M 4/625; H01M 4/525
See application file for complete search history.

(56) References Cited

U.S. PATENT DOCUMENTS

| | | | | |
|---|---|---|---|---|
| 2011/0027646 A1* | 2/2011 | Lee | ........................ | H01M 4/131 429/188 |
| 2014/0335408 A1* | 11/2014 | Cho | ....................... | H01M 4/622 429/217 |
| 2015/0064574 A1* | 3/2015 | He | .................... | H01M 10/0568 429/300 |

FOREIGN PATENT DOCUMENTS

| | | |
|---|---|---|
| JP | 2001-110418 A | 4/2001 |
| JP | 2011-034699 A | 2/2011 |

\* cited by examiner

*Primary Examiner* — Cynthia H Kelly
*Assistant Examiner* — Monique M Wills
(74) *Attorney, Agent, or Firm* — Lee & Morse, P.C.

(57) ABSTRACT

A negative electrode for a rechargeable lithium battery includes a negative active material including a titanium-containing oxide and amorphous carbon. The titanium-containing oxide is present in a larger amount than the amorphous carbon.

9 Claims, 2 Drawing Sheets

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2016-0021997, filed on Feb. 24, 2016, in the Korean Intellectual Property Office, and entitled: "Negative Electrode for Rechargeable Lithium Battery and Rechargeable Lithium Battery Including Same," is incorporated by reference herein in its entirety.

BACKGROUND

1. Field

A negative electrode for a rechargeable lithium battery and a rechargeable lithium battery including the same are disclosed.

2. Description of the Related Art

To address environmental issues, efforts have been made to develop low-carbon next-generation energy. For example, research on, and development of, electric vehicles for replacing conventional gasoline and diesel engine has been actively conducted.

SUMMARY

Embodiments are directed to a negative electrode for a rechargeable lithium battery including a negative active material including a titanium-containing oxide and amorphous carbon. The titanium-containing oxide is present in a larger amount than the amorphous carbon.

The amorphous carbon may be present in an amount of about 1 wt % to about 30 wt % based on the total amount of the titanium-containing oxide and the amorphous carbon.

The titanium-containing oxide may include $TiO_2$, $LiTiO_2$, $LiTi_2O_4$, $Li_4Ti_5O_{12}$, or a combination thereof.

The titanium-containing oxide may have a particle diameter (D50) of about 1 μm to about 30 μm.

The amorphous carbon may include hard carbon, soft carbon, or a combination thereof.

A specific surface area of the amorphous carbon may be about 1.5 $m^2/g$ to about 2.5 $m^2/g$.

A particle diameter (D50) of the amorphous carbon may be about 5 μm to about 30 μm.

Embodiments are also directed to a rechargeable lithium battery including the negative electrode as described above, a positive electrode, and an electrolyte solution.

The positive electrode may include a positive active material including a lithium metal compound and activated carbon.

The lithium metal compound may include a lithium nickel-based compound selected from a lithium nickel oxide, a lithium nickel cobalt manganese oxide, a lithium nickel cobalt aluminum oxide, a lithium nickel phosphate, and a combination thereof.

The activated carbon of the positive electrode may be present in an amount of about 1 wt % to about 15 wt % based on the total amount of the lithium metal compound and the activated carbon.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
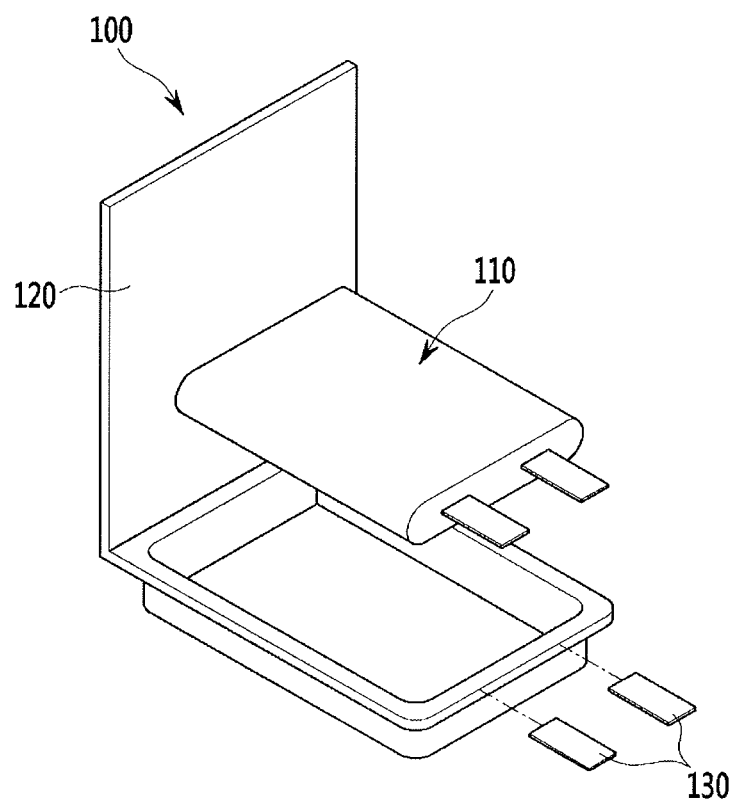
FIG. 1 illustrates a schematic view of a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions may be exaggerated for clarity of illustration.

A negative electrode for a rechargeable lithium battery according to the present embodiment includes a current collector and a negative active material layer formed on the current collector. The negative active material layer may include a negative active material. The negative active material may include a titanium-containing oxide and amorphous carbon. When the amorphous carbon is added to the titanium-containing oxide as a negative active material for a rechargeable lithium battery, excellent capacity characteristics and cycle-life characteristics may be ensured while high-rate charge and discharge characteristics of a rechargeable lithium battery may be remarkably improved.

The titanium-containing oxide may include titanium oxide, lithium titanium oxide, or a combination thereof. The titanium oxide may include $TiO_2$, and the lithium titanium oxide may include $LiTiO_2$, $LiTi_2O_4$, $Li_4Ti_5O_{12}$, or a combination thereof.

When the titanium-containing oxide is used as a negative active material for a rechargeable lithium battery, decomposition of an electrolyte solution may be prevented or reduced, since the oxidization/reduction potential of a negative electrode is relatively about 1.5 V higher than a Li/Li$^+$ potential. Accordingly, improved cycle characteristics may be obtained due to stability of a crystal structure of the titanium-containing oxide.

The titanium-containing oxide may have a particle diameter (D50) of about 1 μm to about 30 μm, or, for example, about 3 μm to about 10 μm. The term "particle diameter (D50)" indicates a diameter where an accumulated volume is about 50 volume % in a particle distribution. When the titanium-containing oxide has a particle diameter (D50) within the range, excellent dispersity and high active mass density may be obtained during mixing amorphous carbon, a conductive material, and a binder, and thus capacity and high-rate charge and discharge characteristics may be improved.

The titanium-containing oxide may be present in a larger amount than the amorphous carbon. When the amorphous carbon as an additive is included with the titanium-containing oxide as a negative active material, high-rate charge and discharge characteristics of a rechargeable lithium battery may be improved, as well as capacity characteristics and cycle-life characteristics. The titanium-containing oxide may be present in an amount of, for example, about 70 wt % to about 99 wt %, or, for example, about 75 wt % to about 99 wt %, or, for example, about 75 wt % to about 90 wt %, or, for example, about 75 wt % to about 85 wt % based on the total amount of the titanium-containing oxide and the amorphous carbon. When the titanium-containing oxide is used within the ranges, high-rate charge and discharge characteristics and cycle-life characteristics of a rechargeable lithium battery may be improved.

The amorphous carbon may be provided for physical adsorption/desorption of lithium ions in the negative electrode and an electrochemical intercalation/deintercalation of the lithium ions, such that the lithium ions may be rapidly transferred to the titanium-containing oxide. When the amorphous carbon is added to the titanium-containing oxide as a negative active material, the amorphous carbon may increase a concentration of the lithium ions during charge and discharge and may smoothly transfer lithium ions in a negative electrode plate, thus decreasing a concentration polarization of the surface of the electrode plate, and resultantly improving high-rate charge and discharge characteristics.

The amorphous carbon may include hard carbon, soft carbon, or a combination thereof.

The term "hard carbon" refers to a carbon material in which small graphite crystals are gathered in disorder and thus are neither graphitized nor form a layered structure. For example, hard carbon may be obtained from a precursor of a polyvinyl alcohol resin, a furfuryl alcohol resin, triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, ethylene-propylene-diene monomer (EPDM), polyacrylic acid, sodium polyacrylate, polyacrylonitrile, glucose, gelatin, a saccharide, a phenolic resin, a naphthalene resin, a polyamide resin, a furan resin, a polyimide resin, a cellulose resin, a styrene resin, an epoxy resin, a vinyl chloride resin, or a combination thereof.

The term "soft carbon" refers to a carbon material that is mechanically soft and in which small graphite crystals are gathered in order and easily graphitized through a heat treatment at 1,800° C. to 2,000° C. Soft carbon may be obtained from a precursor of coal pitch, petroleum pitch, polyvinylchloride, mesophase pitch, tar, low molecular weight heavy oil, or a combination thereof.

The amorphous carbon may have a specific surface area of about 1 m²/g to about 10 m²/g, or, for example, about 1.5 m²/g to about 2.5 m²/g. When a specific surface area of the amorphous carbon is within the ranges, capacity required for a battery for a car may be ensured and simultaneously, high-rate charge and discharge characteristics may be maintained.

The amorphous carbon may have a particle diameter (D50) of about 5 μm to about 30 μm, or, for example, about 10 μm to about 15 μm. As noted above, the term "particle diameter (D50)" indicates a diameter where an accumulated volume is about 50 volume % in a particle distribution. When the amorphous carbon has a particle diameter (D50) within the ranges, amorphous structures of amorphous carbon may be embodied, and improved capacity characteristics and good cycle-life characteristics may be realized.

The amorphous carbon may be present in an amount of about 1 wt % to about 30 wt %, or, for example, about 15 to about 25 wt % based on the total amount of the titanium-containing oxide and the amorphous carbon. When the amorphous carbon is present within the ranges, excellent capacity characteristics and cycle-life characteristics may be ensured and high-rate charge and discharge characteristics may be improved.

The negative active material layer may include at least one of a conductive material and a binder in addition to the negative active material.

The conductive material improves conductivity of a negative electrode. A suitable electrically conductive material that does not cause chemical change may be used as a conductive material. Examples of the conductive material include a carbon-based material such as natural graphite, artificial graphite, carbon black, acetylene black, ketjen black, a carbon fiber or the like; a metal-based material such as a metal powder or a metal fiber including copper, nickel, aluminum, silver, or the like; a conductive polymer such as a polyphenylene derivative; or a mixture thereof.

The binder improves binding properties of negative active material particles with one another and with a current collector. Examples of the binder include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The negative active material layer may be formed on a current collector. The current collector may include copper, as an example.

The negative electrode may be manufactured by a method including mixing the negative active material, and optionally, the conductive material and binder, in a solvent to prepare a negative electrode composition, and coating the negative electrode composition onto the current collector, followed by compressing and drying the resultant. The solvent may include N-methylpyrrolidone, water or the like, as examples.

Hereinafter, a rechargeable lithium battery including the negative electrode is described referring to FIG. 1.

FIG. 1 illustrates a schematic view showing a rechargeable lithium battery according to an embodiment.

Referring to FIG. 1, a rechargeable lithium battery 100 according to an embodiment may include an electrode assembly 110, a battery case 120 housing the electrode assembly 110, and an electrode tab 130 providing an electrical channel for externally inducing a current formed in the electrode assembly 110. Both sides of the battery case 120 may be overlapped with each other at edges and sealed. In addition, an electrolyte solution may be injected into the battery case 120 housing the electrode assembly 110. The electrode assembly 110 may include a positive electrode, a negative electrode facing the positive electrode, and a separator interposed between the negative electrode and the positive electrode.

In other implementations, the rechargeable lithium battery including a negative electrode as described herein may have other shapes, such as cylindrical, prismatic, coin-type, or pouch shapes.

The negative electrode is the same as described above.

The positive electrode may include a current collector and a positive active material layer formed on the current collector. The positive active material layer may include a positive active material.

According to an embodiment, the positive active material may include a lithium metal compound and activated carbon. When the activated carbon is added to the lithium metal compound as a positive active material for a rechargeable lithium battery, a concentration of lithium ions may increase around the lithium metal compound, and thus, high-rate charge and discharge characteristics may be further improved and excellent cycle-life characteristics may be ensured.

The lithium metal compound may be a compound that reversibly intercalates or deintercalates lithium. For example, the lithium metal compound may be a compound represented by one of following chemical formulae.

$Li_aA_{1-b}X_bD_2$ ($0.90 \leq a \leq 1.8$, $0 \leq b \leq 0.5$); $Li_aA_{1-b}X_bO_{2-c}D_e$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

According to an embodiment, the lithium metal compound may be a lithium nickel-based compound. The lithium nickel-based compound may be or include a lithium nickel oxide, a lithium nickel cobalt manganese oxide, a lithium nickel cobalt aluminum oxide, a lithium nickel phosphate, or a combination thereof.

The activated carbon may have a specific surface area of about 1,000 m$^2$/g to about 3,000 m$^2$/g, or, for example, about 1,500 m$^2$/g to about 1,800 m$^2$/g. When a specific surface area is within the ranges, a rechargeable lithium battery may have high input and output characteristics and improved cycle-life characteristics.

A particle diameter (D50) of the activated carbon may be about 1 μm to about 20 μm, or, for example, about 3 μm to about 5 μm. As noted above, the term "particle diameter (D50)" indicates a diameter where an accumulated volume is about 50 volume % in a particle distribution. When the particle diameter (D50) of the activated carbon is within the range, a rechargeable lithium battery may have high input and output characteristics.

The activated carbon may be present in an amount of about 1 wt % to about 15 wt %, or, for example, about 1 wt % to about 10 wt %, or about 1 wt % to about 5 wt % based on the total amount of the lithium metal compound and the activated carbon. When the activated carbon is present within the range, high-rate charge and discharge characteristics are improved and excellent cycle-life characteristic may be ensured.

The positive active material layer may include at least one of a conductive material and a binder in addition to the positive active material.

The conductive material improves conductivity of a positive electrode. A suitable electrically conductive material that does not cause a chemical change may be used as a conductive material. Examples of the conductive material may include a carbon-based material such as natural graphite, artificial graphite, carbon black, acetylene black, ketjen black, a carbon fiber or the like; a metal-based material such as of a metal powder or a metal fiber including copper, nickel, aluminum, silver, or the like; a conductive polymer such as a polyphenylene derivative; or a mixture thereof.

The binder improves binding properties of positive active material particles with one another and with a current collector. Examples thereof may include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The positive active material layer may be formed on a current collector. The current collector may be aluminum, as an example.

The positive electrode may be manufactured by a method including mixing the positive active material, and optionally, the conductive material and binder, in a solvent to prepare a positive electrode composition, and coating the positive electrode composition onto the current collector followed by compressing and drying the resultant. The solvent may include N-methylpyrrolidone, water or the like, as examples.

The electrolyte solution may include a non-aqueous organic solvent and a lithium salt.

The non-aqueous organic solvent may serve as a medium for transmitting ions taking part in the electrochemical reaction of a battery. The non-aqueous organic solvent may be selected from a carbonate-based, ester-based, ether-based, ketone-based, alcohol-based, and aprotic solvent.

The carbonate-based solvent may be or include, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

When the carbonate-based solvent is prepared by mixing a cyclic carbonate and a linear carbonate, a solvent having a low viscosity while having an increased dielectric constant may be obtained. The cyclic carbonate and the linear carbonate may be mixed together in the volume ratio of about 1:1 to 1:9.

The ester-based solvent may include, for example, methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include, for example dibutylether, tetraglyme, diglyme, dimethoxyethane, 2-methyltetrahydrofuran, tetrahydrofuran, or the like, and the ketone-based solvent may include cyclohexanone, or the like. The alcohol-based solvent may include ethanol, isopropyl alcohol, or the like.

The non-aqueous organic solvent may be used singularly or in a mixture. When the organic solvent is used in a mixture, the mixture ratio may be controlled in accordance with a desirable battery performance.

The non-aqueous electrolyte solution may further include an overcharge-inhibiting additive such as ethylene carbonate, pyrocarbonate, or like.

The lithium salt dissolved in the non-aqueous organic solvent supplies lithium ions in the battery, operates a basic operation of a rechargeable lithium battery and improves lithium ion transportation between positive and negative electrodes.

Specific examples of the lithium salt may include one selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, $LiB(C_2O_4)_2$ (lithium bis(oxalato) borate; LiBOB), or a combination thereof.

The lithium salt may be used in a concentration ranging from about 0.1 M to about 2.0 M. When the lithium salt is included in the concentration range, an electrolyte solution may have excellent performance and lithium ion mobility due to appropriate conductivity and viscosity of an electrolyte solution.

The separator may include any materials commonly used in a general lithium battery to separate the negative electrode from the positive electrode and provide a transporting passage of lithium ions. For example, the material of the separator may have a low resistance to ion transport and an excellent impregnation for an electrolyte solution. For example, the material of the separator may be selected from glass fiber, polyester, polyethylene, polypropylene, polytetrafluoroethylene (PTFE), or a combination thereof. The material of the separator may have a form of a non-woven fabric or a woven fabric. For example, a polyolefin-based polymer separator such as polyethylene, polypropylene or the like may be used. In order to ensure the heat resistance or mechanical strength, a coated separator including a ceramic component or a polymer material may be used. The separator may have a mono-layered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Rechargeable Lithium Battery Cell

Example 1

$LiCoO_2$ having an average particle diameter (D50) of 5 μm, activated carbon having an average particle diameter (D50) of 6.8 μm (YP50F, Kuraray Co., Ltd.), carbon black (denka black), and polyvinylidene fluoride in a weight ratio of 85:5:4:6 were mixed with N-methylpyrrolidone, preparing a slurry. The prepared slurry was coated on a 15 μm-thick aluminum foil, dried, and compressed to manufacture a positive electrode.

A mixture of $Li_4Ti_5O_{12}$ having a particle diameter (D50) of 5 μm and amorphous carbon having an average particle diameter (D50) of 10 μm (Power Carbon Technology Co., Ltd.) as soft carbon, carbon black (denka black), and polyvinylidene fluoride in a weight ratio of 89:5:6 were mixed with N-methylpyrrolidone to prepare a slurry. Herein, the amorphous carbon was used in an amount of 5 wt % based on the total amount of the mixture. The amorphous carbon had a specific surface area of 1.5 $m^2$/g to 2.0 $m^2$/g. The slurry was coated on a 15 μm-thick aluminum foil and then dried and compressed to manufacture a negative electrode.

The positive electrode and the negative electrode were separated by a separator made of a polyethylene material to form an electrode assembly, and an electrolyte solution was implanted thereinto, thereby manufacturing a 50 mAh pouch-type rechargeable lithium battery cell. The electrolyte solution was prepared by mixing ethylene carbonate (PC), ethylmethyl carbonate (DMC), and diethyl carbonate (DEC) in a volume ratio of 2:6:2 and adding 1.15 M $LiPF_6$ to the mixed solvent.

Example 2

A rechargeable lithium battery cell was manufactured according to the same method as Example 1, except for using the amorphous carbon in an amount of 15 wt % based on the total amount of the mixture to manufacture the negative electrode in Example 1.

Example 3

A rechargeable lithium battery cell was manufactured according to the same method as Example 1, except for using the amorphous carbon in an amount of 30 wt % based on the total amount of the mixture to manufacture the negative electrode in Example 1.

Example 4

A rechargeable lithium battery cell was manufactured according to the same method as Example 1, except that the positive electrode was manufactured by the following method.

$LiCoO_2$ having an average particle diameter (D50) of 5 μm, carbon black, and polyvinylidene fluoride in a weight ratio of 90:4:6 were mixed in N-methylpyrrolidone, preparing a slurry. The slurry was coated onto a 15 μm-thick aluminum foil and then dried and compressed to manufacture the positive electrode.

Example 5

A rechargeable lithium battery was manufactured according to the same method as Example 1, except for using $LiNi_{1/3}Co_{1/3}Mn_{1/3}O_2$ having an average particle diameter (D50) of 5 μm instead of $LiCoO_2$ to manufacture the positive electrode in Example 1.

Example 6

A rechargeable lithium battery was manufactured according to the same method as Example 1, except for using $LiFePO_4$ having an average particle diameter (D50) of 0.5 μm instead of $LiCoO_2$ to manufacture the positive electrode in Example 1.

Example 7

A rechargeable lithium battery was manufactured according to the same method as Example 1, except for using amorphous carbon having a particle diameter (D50) of 5 μm and a specific surface area ranging from 9.0 $m^2$/g to 10.0 $m^2$/g (manufactured by EnerG2) as hard carbon in an amount of 15 wt % based on the total amount of the mixture to manufacture the negative electrode in Example 1.

Comparative Example 1

A rechargeable lithium battery was manufactured according to the same method as Example 1 except for mixing $Li_4Ti_5O_{12}$, carbon black, and polyvinylidene fluoride in a weight ratio of 89:5:6 to manufacture the negative electrode in Example 1.

Comparative Example 2

A rechargeable lithium battery was manufactured according to the same method as Example 1 except for mixing $Li_4Ti_5O_{12}$, carbon black, and polyvinylidene fluoride in a weight ratio of 89:5:6 to manufacture the negative electrode in Example 5.

Comparative Example 3

A rechargeable lithium battery was manufactured according to the same method as Example 1 except for mixing $Li_4Ti_5O_{12}$, carbon black, and polyvinylidene fluoride in a weight ratio of 89:5:6 to manufacture the negative electrode in Example 6.

Evaluation 1: Electrochemical Characteristics of Rechargeable Lithium Battery Cells Capacity characteristics, cycle-life characteristics, and high-rate charge and discharge characteristics of each rechargeable lithium battery cell according to Examples 1 to 7 and Comparative Examples 1 to 3 were evaluated as follows, and the results are provided in Table 1 and FIG. 2.

The cells were charged at 1 C under a constant current, the charge was cut-off at a cell voltage of 4.2 V, and the cells were discharged up to 2.0 V at 50 C.

Figure 2:
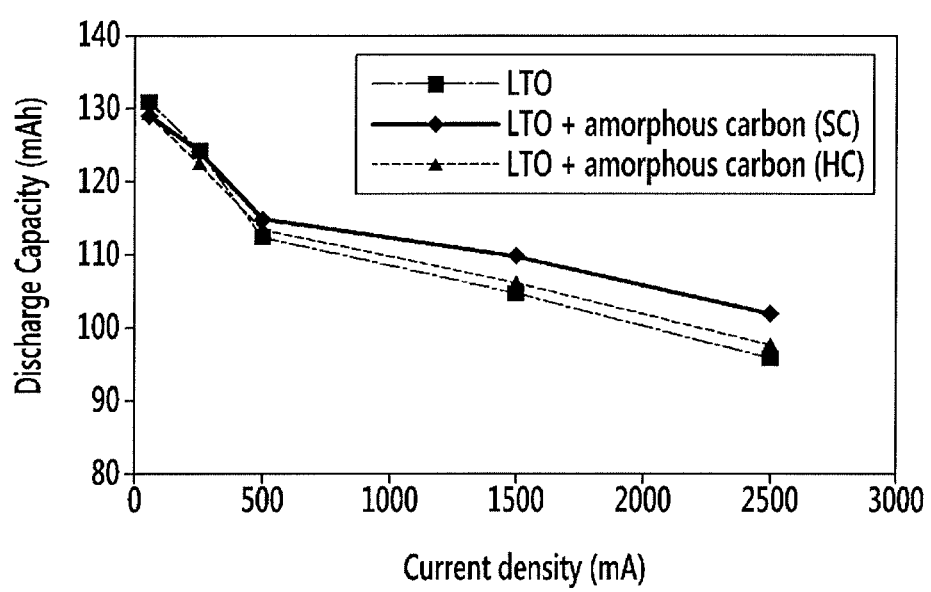
FIG. 2 illustrates a graph showing high-rate charge and discharge characteristics of rechargeable lithium battery cells according to Example 1, Example 7, and Comparative Example 1.

FIG. 2 illustrates a graph showing high-rate charge and discharge characteristics of rechargeable lithium battery cells according to Example 1, Example 7, and Comparative Example 1. Referring to FIG. 2, Example 1 (soft carbon, SC) and Example 7 (hard carbon, HC) using a negative active material including titanium-containing oxide and amorphous carbon showed excellent high-rate charge and discharge characteristics compared with Comparative Example 1 using no amorphous carbon.

In addition, the rechargeable lithium battery cells according to Examples 1 and 7 also showed excellent high-rate charge and discharge characteristics, indicating that the amorphous carbon accompanied an intercalation-deintercalation reaction and an adsorption-desorption reaction of ions and facilitated movement of the $Li^+$ ions. For example, the negative electrode in Example 7 had a larger active area for adsorbing and desorbing the $Li^+$ ions due to a larger amount of amorphous carbon than Example 1, and resultantly showed high-rate charge and discharge characteristics.

On the other hand, the rechargeable lithium battery cells according to Examples 1 to 6 using soft carbon showed excellent high-rate charge and discharge characteristics with a same amount of amorphous carbon, as compared with Example 7 using hard carbon. Thus, the rechargeable lithium battery cells according to Examples 1 to 6 may provide a rechargeable lithium battery cell having high capacity and energy density by controlling a temperature during a heat treatment to adjust capacity. For example, Examples 1 to 6 using soft carbon may provide a rechargeable lithium battery cell having excellent workability and energy density compared with Example 7 using hard carbon.

TABLE 1

| | Negative electrode | Positive electrode | | | | |
|---|---|---|---|---|---|---|
| | Amount of amorphous carbon (wt %) | Lithium metal compound | Amount of activated carbon (wt%) | Capacity (mAh) | 10C/1C (%) | 1000 cy/1 cy at 30C (%) |
| Example 1 | Soft carbon 5 | $LiCoO_2$ | 5 | 136 | 83 | 83 |
| Example 2 | Soft carbon 15 | $LiCoO_2$ | 5 | 130.7 | 86 | 94 |
| Example 3 | Soft carbon 30 | $LiCoO_2$ | 5 | 125.3 | 86 | 85 |
| Example 4 | Soft carbon 5 | $LiCoO_2$ | 0 | 135.7 | 70 | 65 |
| Example 5 | Soft carbon 5 | $LiNi_{1/3}Co_{1/3}Mn_{1/3}O_2$ | 5 | 132 | 85 | 82 |
| Example 6 | Soft carbon 5 | $LiFePO_4$ | 5 | 129.5 | 81 | 80 |
| Example 7 | Hard carbon 15 | $LiCoO_2$ | 5 | 129.8 | 82 | 89 |
| Comparative Example 1 | 0 | $LiCoO_2$ | 5 | 121.5 | 79 | 55 |
| Comparative Example 2 | 0 | $LiNi_{1/3}Co_{1/3}Mn_{1/3}O_2$ | 5 | 130.9 | 80 | 60 |
| Comparative Example 3 | 0 | $LiFePO_4$ | 5 | 128.1 | 75 | 49 |

In Table 1, the amount (wt %) of amorphous carbon is based on the total amount of $Li_4Ti_5O_{12}$ and the amorphous carbon.

In Table 1, the amount (wt %) of activated carbon is based on the total amount of positive electrode slurry.

Referring to Table 1, Examples 1 to 7 using a negative active material including titanium-containing oxide and amorphous carbon showed remarkably improved high-rate charge and discharge characteristics and also, excellent characteristic and cycle-life characteristics compared with Comparative Example 1 to 3 using a negative active material including no amorphous carbon.

By way of summation and review, to address environmental issues, efforts have been made to develop low-carbon next-generation energy. For example, research on, and development of, electric vehicles for replacing conventional gasoline and diesel engine has been actively conducted. Various next-generation cars such as EV (an electric vehicle), HEV (a hybrid electric vehicle), and PHEV (a plug-in hybrid electric vehicle) by combining an engine and a battery are being developed. In addition, LVS (a Low Voltage System) capable of replacing a lead storage battery is also being actively developed as a system to be widely used in anticipation of electric vehicle becoming commercially available in the future. The currently-developed LVS may be an outcome of total integration of battery technologies to accomplish low resistance characteristics of a rechargeable lithium battery.

A rechargeable lithium battery has a structure that an electrolyte solution including a lithium salt is impregnated into an electrode assembly including positive and negative electrodes and a porous separator interposed therebetween. A positive active material generally includes a lithium cobalt-based oxide, a lithium manganese-based oxide, a lithium nickel-based oxide, a lithium composite oxide, or the like, while a negative active material generally includes a carbon-based material.

However, a rechargeable lithium battery using a carbon-based material as a negative active material may have irreversible capacity as a result of lithium ions being inserted into the layered structure of the carbon-based material during initial charge and discharge. In addition, a carbon material may have a low oxidation/reduction potential of about 0.1 V relative to a Li/Li+ potential, and thus the electrolyte solution may be decomposed on the surface of the negative electrode and may react with lithium to form a SEI (solid electrolyte interface) film on the surface. The SEI film may have a thickness and an interface state varying depending on an electrolyte solution system. The SEI film may have an influence on charge and discharge characteristics. Even when the SEI film is thin, the SEI film may increase the resistance in a rechargeable battery may bring about RDS (rate determining step) in uses requiring high power characteristics such as a power tool. In addition, a lithium compound produced on the surface of the negative electrode may deteriorate reversible capacity of lithium during repetitive charges and discharges and thus may decrease discharge capacity and degrade a cycle life.

Embodiments provide a negative electrode for a rechargeable lithium battery having improved high-rate charge, capacity characteristics, and discharge characteristics and cycle-life characteristics. Embodiments further provide a rechargeable lithium battery including the negative electrode for a rechargeable lithium battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode for a rechargeable lithium battery, the negative electrode comprising
a negative active material including a titanium-containing oxide selected from the group consisting of $TiO_2$, $LiTiO_2$, $LiTi_2O_4$, $Li_4Ti_5O_{12}$ or a combination thereof, and amorphous carbon, wherein:
the titanium-containing oxide is present in a larger amount than the amorphous carbon, and
a specific surface area of the amorphous carbon is about 1.5 $m^2/g$ to about 2.5 $m^2/g$.

2. The negative electrode as claimed in claim 1, wherein the amorphous carbon is present in an amount of about 1 wt % to about 30 wt % based on the total amount of the titanium-containing oxide and the amorphous carbon.

3. The negative electrode as claimed in claim 1, wherein the titanium-containing oxide has a particle diameter (D50) of about 1 μm to about 30 μm.

4. The negative electrode as claimed in claim 1, wherein the amorphous carbon includes hard carbon, soft carbon, or a combination thereof.

5. The negative electrode as claimed in claim 1, wherein a particle diameter (D50) of the amorphous carbon is about 5 μm to about 30 μm.

6. A rechargeable lithium battery, comprising
the negative electrode as claimed in claim 1;
a positive electrode; and
an electrolyte solution.

7. The rechargeable lithium battery as claimed in claim 6, wherein the positive electrode includes a positive active material including a lithium metal compound and activated carbon.

8. The rechargeable lithium battery as claimed in claim 7, wherein the lithium metal compound includes a lithium nickel-based compound selected from a lithium nickel oxide, a lithium nickel cobalt manganese oxide, a lithium nickel cobalt aluminum oxide, a lithium nickel phosphate, and a combination thereof.

9. The rechargeable lithium battery as claimed in claim 7, wherein the activated carbon of the positive electrode is present in an amount of about 1 wt % to about 15 wt % based on the total amount of the lithium metal compound and the activated carbon.

* * * * *